Dec. 5, 1933.  G. T. RONK  1,937,532
COMBINED ROAD AND RAIL TRUCK
Filed Sept. 8, 1931  4 Sheets-Sheet 1

Inventor
George T. Ronk
by Orwig & Hague Attys

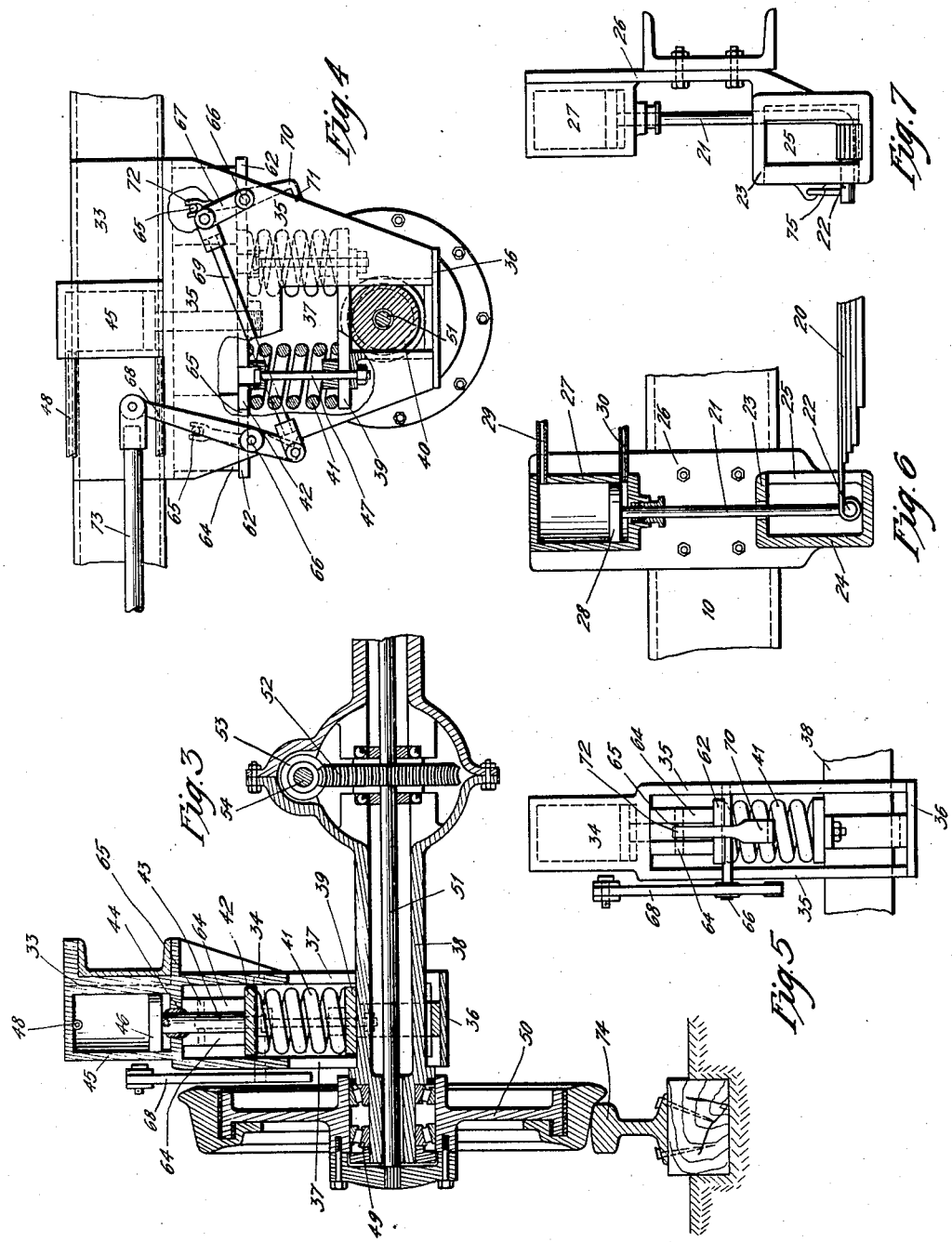

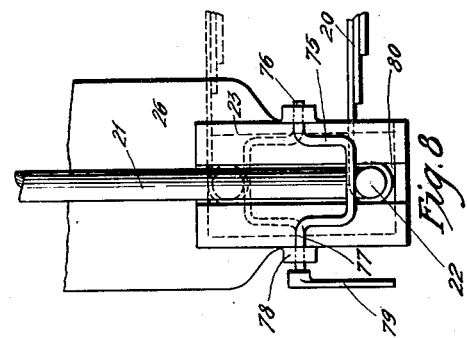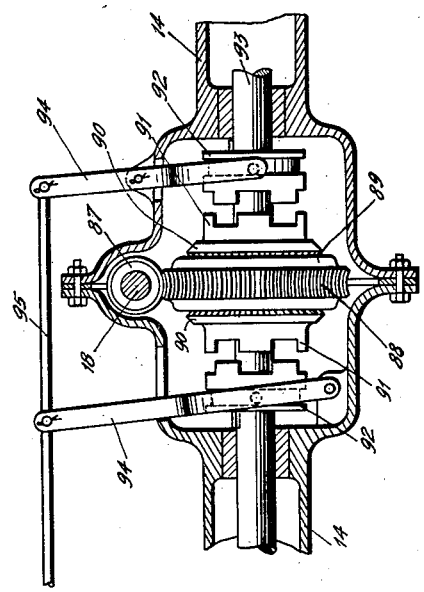

Dec. 5, 1933.  G. T. RONK  1,937,532
COMBINED ROAD AND RAIL TRUCK
Filed Sept. 8, 1931  4 Sheets-Sheet 4
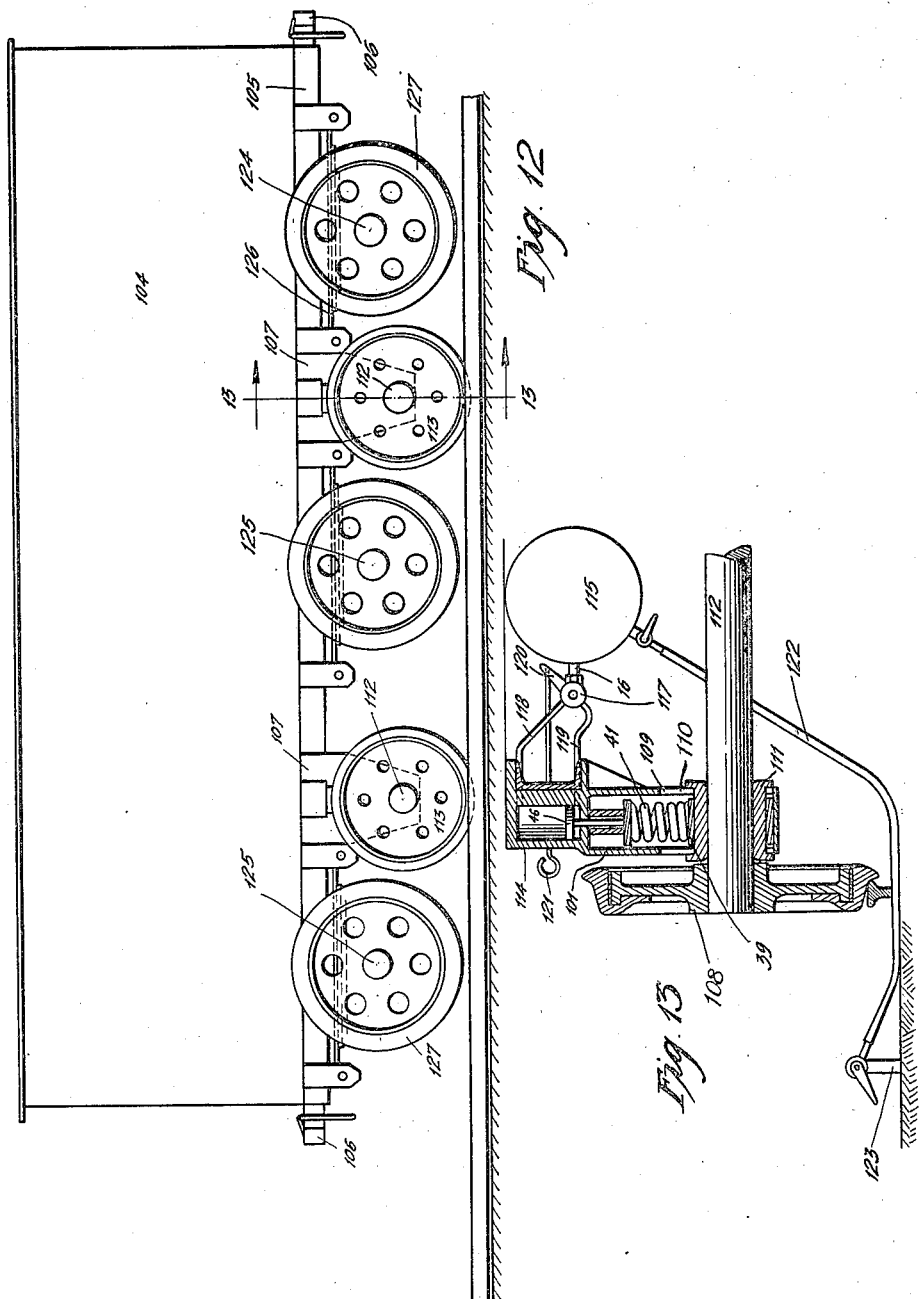
Inventor
George T. Ronk
By Orwig & Hague Attys.

Patented Dec. 5, 1933

1,937,532

UNITED STATES PATENT OFFICE

1,937,532

COMBINED ROAD AND RAIL TRUCK

George T. Ronk, Cedar Rapids, Iowa

Application September 8, 1931. Serial No. 561,615

6 Claims. (Cl. 105—215)

The object of my invention is to provide an improved truck so constructed that it may be adapted to be operated either on a railway track or on a highway; and to provide in connection therewith means whereby the truck may be easily and quickly converted for highway or railway operation.

More specifically it is the object of my invention to provide a truck having one set of axles designed to support wheels having cushion tires for highway operation substantially the same as employed on automobile trucks now in common use; and to provide in connection therewith an extra set of axles designed to support flanged wheels such as employed on railway cars; and in connection therewith means whereby one set of axles, preferably the ones carrying the railway wheels, may be elevated and lowered relative to the frame in such manner that when in a lowered position the highway wheels are supported above the rails, and when the said axles are in an elevated position, the highway wheels are permitted to travel on the highway surface with the flanged wheels above said surface.

A further object is to provide in a truck having a set of highway wheels and a set of track wheels improved means for elevating and lowering one set of wheels relative to the frame and relative to the other set of wheels.

A further object is to provide in a truck of that type employing one set of track wheels and one set of highway wheels improved means for transmitting power to said wheels.

My invention consists in the construction, arrangement and combination of the various parts of the device, whereby the objects contemplated are attained, as hereinafter more fully set forth, pointed out in my claims, and illustrated in the accompanying drawings, in which:

Figure 3 is an enlarged, detail, sectional view taken on the line 3—3 of Figure 1.

Figure 4 is a detail side elevation of one of the brackets and the yieldable bearings carried thereby for supporting the adjustable axle.

Figure 5 is an end elevation of one of said brackets.

Figure 6 is a detail sectional view of the mechanism for elevating and lowering the front end of the front springs.

Figure 7 is an end elevation of Figure 6.

Figure 8 is an enlarged side elevation of the locking device employed on the mechanically operated means for elevating and lowering the front end of the front springs.

Figure 9 is a detail sectional view taken on the line 9—9 of Figure 2.

Figure 10 is a detail sectional view taken on the line 10—10 of Figure 2.

Figure 11 is a side elevation of a truck employing my invention and showing a modified means for driving the truck wheels.

Figure 12 is a side elevation of one form of truck adapted to be used as a trailer, and which has a pair of car axles having flanged wheels supported thereon, and an axle ahead and another axle behind each of said axles, designed to support road wheels, which is particularly adapted for conveying heavy loads.

Figure 13 is a detail sectional view taken on the line 13—13 of Figure 12, and showing one means of applying a fluid pressure to the axle elevating and lowering device.

Figure 1:
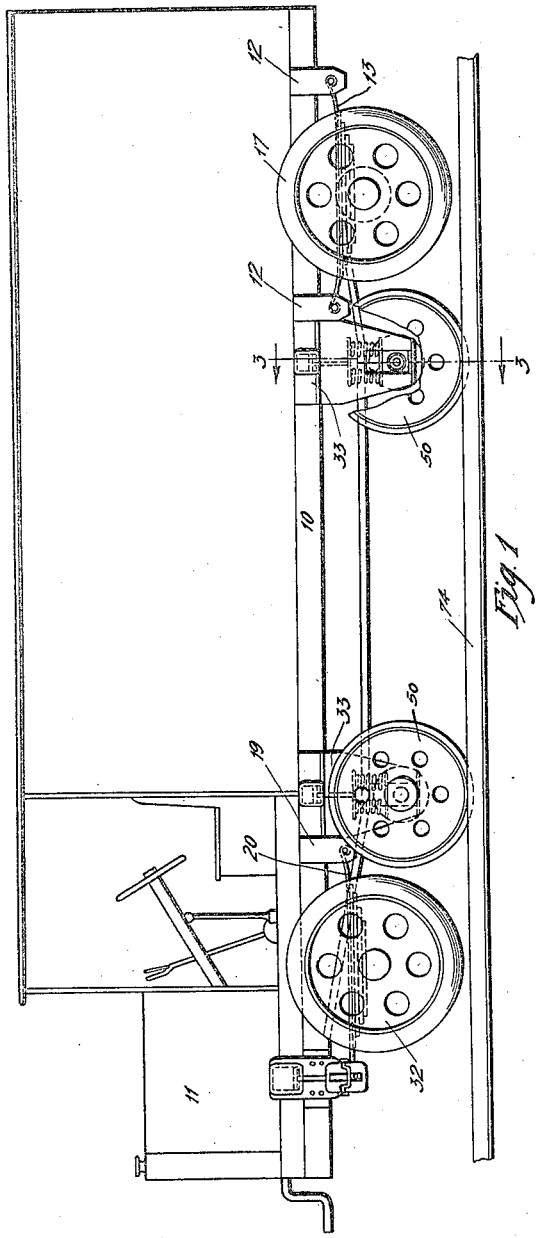
Figure 1 is a side elevation of my improved truck.
Figure 2:
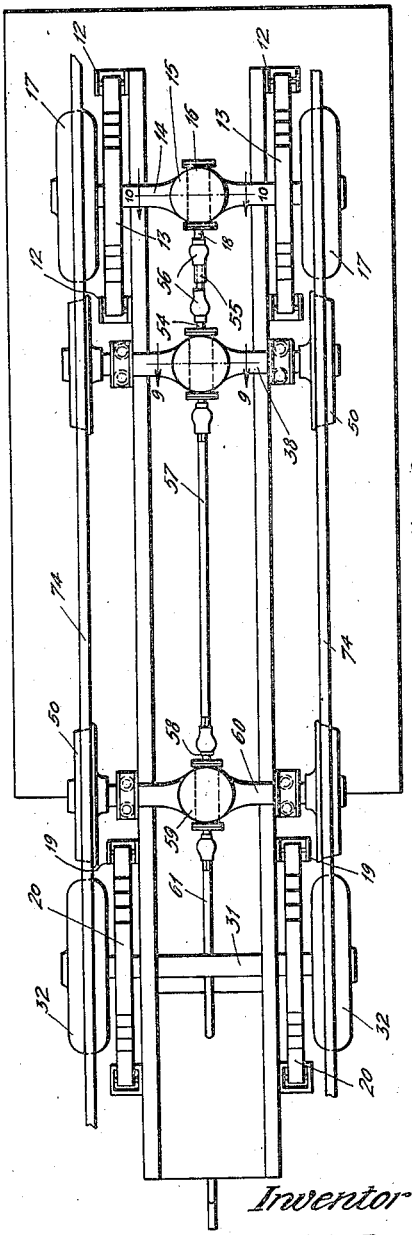
Figure 2 is a bottom view of the same.

Referring to the accompanying drawings, I have used the reference numeral 10 to indicate the truck frame, having at its forward end the usual hood 11 in which is mounted the internal combustion engine of ordinary construction, which is not here illustrated inasmuch as it forms no part of my present invention.

The back end of the frame is provided with downwardly extending brackets 12 designed to support springs 13 carried by an axle housing 14 of ordinary construction, such as used in automobile trucks. Said axle housing has the usual differential housing 15 and a worm gear housing 16. Pneumatic wheels 17 are carried by the axle housing 14. A drive shaft 18 is provided for transmitting power to the wheels 17.

Secured near the forward end of the frame 10 are downwardly extending brackets 19 designed to support the rear end of springs 20. The forward end of each of the springs 20 is supported by means of a shaft 21 having a laterally extending portion 22 to which the spring is pivotally connected. The lower end of the shaft 21 is slidably mounted in a bearing 23 forming part of a housing 24 having a slot 25 through which the forward end of the spring 20 extends. Said slot permits up and down movement of the spring and at the same time limits the spring against lateral movement.

The housing 24 is carried by a bracket 26 secured to the frame member 10. The upper end of the bracket 26 is provided with a hydraulic cylinder 27 having a piston 28 connected to the upper end of the shaft 21. Pipes 29 and 30 are provided, one in the upper end of the cylinder and the other in the lower end, so that the piston 28 may be moved upwardly or downwardly by fluid, such as oil, forced into the cylinder under pressure. Any suitable pump mechanism may be provided for producing the necessary pressure, which may be operated from the automobile engine.

Thus means is provided whereby the forward end of the spring 20 may be elevated and lowered at the will of the operator for elevating and lowering the front axle 31 secured to the springs 20 and to carry with it the wheels 32, which are of the ordinary type employing pneumatic tires. The usual steering mechanism is provided for steering the wheels 32.

Means is thus provided for guiding the truck when the wheels 17 and 32 are in contact with the ground surface. In a similar manner one or both ends of the rear springs 13 may be elevated and lowered with respect to the frame 10 if so desired, by simply substituting for the brackets 12 a mechanism similar to the bracket 26, the housing 24 and the cylinder 27.

Supported on each side of the frame 10 and between the axle 31 and the axle housing 14 is a pair of downwardly extending pedestals 33, one set immediately behind the brackets 19 and one set in front of the forward brackets 12. Each of the pedestals 33 is preferably in the form of housings having side members 35 and a bottom plate 36. The side members 35 have vertically arranged slots 37 through which one end of an axle housing 38 extends, said housing being free to move upwardly and downwardly in the slots 37.

Supported above the housing 38 is a plate 39 slidably mounted to move upwardly and downwardly between the side members 35 and secured in position on the housing by means of a strap 40, the ends of which are bent outwardly and designed to engage the under surface of the bar 39.

Supported on each end of the bar 39 is a spring 41 having its upper end engaging a plate 42, said plate also being slidably mounted between the members 35. The plate 42 has an upwardly extending plunger 43 slidably mounted in the top 44 of the housing.

Mounted on the top member 44 is a hydraulic cylinder 45 in which is slidably mounted a piston 46, which is attached to the plunger 42. The plate 42 is provided with downwardly extending bolts 47 which extend downwardly through the spring 41, having its lower end extending through the plate 39 and the laterally extending portion of the member 40. Bolts limit the upward movement of the member 42 relative to the member 40. Bolts 47 provide means whereby the plate 39 may be lifted in unison with the plate 42, and in turn the strap 40 and the axle housing 38, and at the same time keep the spring 41 under working tension.

The plunger 43 and the piston 46 provide means for lifting the plate 42, the cylinder 45 having pipes 48 by means of which fluid under pressure may be caused to enter the cylinder 45 and elevate or lower the piston 46, causing the load of the frame 10 to be carried by the axle housing 38 or the said housing to be elevated to relieve them of the load.

The outer end of the axle housing is provided with suitable roller bearings 49 on which the car wheels 50 are supported. The wheels are driven by a full floating axle 51, the inner ends of which are connected to a worm gear 52. Said worm gear is driven by means of a worm 53 fixed to a shaft 54. The rear end of the shaft 54 is operatively connected with the shaft 18 by means of a telescopic connecting rod 55 and universal joints 56 of ordinary construction.

The forward end of the shaft 54 is connected to a torsion rod 57, the forward end of which is connected to a shaft 58 similar to the shaft 54 extending through the gear housing 59 of an axle housing 60 carried by the forward pedestal 33.

The housing 43, the axle housing 60 and the mechanism for driving the shaft therein are similar to the mechanism just described as applied to the axle housing 38. The forward end of the shaft 58 is operatively connected to a torsion rod 61, the forward end of which is connected to the engine within the hood 11.

No means is provided for driving the front axles 32, although this feature may be added if so desired by mechanism such as employed with the ordinary four wheel drives for automobiles.

Supported between the side members 35 and below the top member 44 is a horizontally arranged partition 62 having an opening 63 in which the member 42 is supported when at its lower limit of movement.

Slidably mounted on each of the members 62 is a pair of locking plates 64 spaced apart and provided with a pin 65. Pivotally supported by each of the members 62 is a shaft 66. The outer end of one of the shafts 66 has a lever 67, and the opposite end of the other shaft 66 has a lever 68. The lower end of the lever 68 and the upper end of the lever 67 is connected by a link 69. The inner end of each of the shafts 66 is provided with a locking bar 70. The lower end of each of the bars 70 has a hook 71. The upper end of each of the bars 70 has a fork 72 designed to engage the adjoining pin 65.

A link 73 is connected to the upper end of the arm 68 and provides means whereby the bars 70 may be rocked, causing the fork member 72 to be moved inwardly as the rear end of the link 73 is moved rearwardly, which in turn will cause the blocks 64 to be moved inwardly to position on top of the outer ends of the member 42.

Thus means is provided for locking the member 42 when at its lower limit of movement against upward movement, with the axle 38 in the lower end of the slots 37. The springs 41 permit yielding upward movement of the axles, when the wheels 50 are in engagement with the track rails 74. The wheels 50 engage said rails at the time the axle 38 is substantially midway between its upper and lower limits of movement.

Fluid is then applied to the upper end of the piston 46, forcing the cylinder 45 upwardly and with it the frame 10 carrying with it the wheels 17 and 32, causing said wheels to be lifted above the top surfaces of the rails 74, at which time the truck is adapted to be operated on a railroad track, the rails of said track guiding the truck in the usual manner.

By moving the link 73 forwardly, then the blocks 64 will be moved outwardly out of engagement with the members 42, after which fluid in the upper end of the cylinder will be discharged, permitting the frame 10 to be lowered until the wheels 17 and 32 rest on the top surface of the rails or on the top surface of a crossing bed or the top surface of a highway in which the rails are mounted.

Fluid is then admitted beneath the piston 46, causing the plates 42 to be elevated and with them the axle housings 38, causing the wheels 50 to be lifted above the rails 74 and the entire weight of the truck carried by the road wheels. The plate 39 will then be in a position at a higher level than the hooks 71. The forward movement of the rod 73 will cause said hooks 71 to be moved into position beneath the ends of the members 39 and cause the said members 39 to be locked in their elevated position together with the wheels 50 and the housing 38. These locking devices safeguard against leakage in the hydraulically operated mechanism. The fluid pressure is applied only at the time the wheels are moved to their elevated or lowered positions of movement.

For locking the pin 22 in either its upper or lower limit of movement, I have provided a substantially U-shaped bar 75, having its ends provided with outwardly extending portions 76 and 77 rotatively mounted in suitable bearings 78. A handle member 79 is fixed to the member 77 and rotates the member 75 either to an elevated or lowered position, and when in a lowered position, as illustrated in Figure 8, it is designed to engage the upper surface of the outer end of the member 22. Said member 22 projects through a slot 80 in the front side of the housing 23. The member 75 prevents downward movement of the housing 23 relative to the rod 21.

The member 75 is adapted to be rotated to its elevated position, as shown by dotted lines in Figure 8, to prevent downward movement of the rod 21 relative to the housing 23, at the time the wheels 32 are being elevated above the ground surface. This locking member 75 is controlled by the handle 79.

In Figure 11 I have illustrated a gear box 81 supported by the frame member 10, and having a drive shaft 82 extended forwardly from its upper end. The forward end of the shaft 82 is operatively connected with the engine shaft.

Supported within the box 81 is the usual transmission gears, not illustrated, inasmuch as they form no part of this invention. Said gears are designed to transmit power from the shaft 82 to the forwardly extending shaft 83 and the rearwardly extending shaft 84.

The forward end of the shaft 83 enters the front gear housing 59 and is operatively connected with the rear end of the shaft 54, before described. The forward end of the shaft 54 is connected to a telescopic shaft 85 which in turn is connected with the gear housing 86 similar to the gear housing 15 before described.

Both gear housings 15 and 86 are provided with a worm 87 mounted on the shaft 18, said worm being in mesh with a worm gear 88 mounted on the central member 89 of the differential gears, said gears being of ordinary construction.

Each of the beveled gears 90 of said differential gears is provided with a clutch member 91 designed to coact with a clutch member 92 feathered to the axles 93. Said axles 93 support wheels 17 and 32. Lever devices 94 are provided for moving the clutch members 92 into and out of engagement with the clutch members 91, said lever devices being pivotally connected to a manually operated rod 95.

Thus means is provided whereby the axles 93 may be thrown out of operative relation with the differential gears, which are rotated continuously through the shaft 18 and the worm gear 87.

In the gear housing 38 I have provided a worm 96 supported on the shaft 54 before described, said worm being designed to mesh with a gear 97 loosely mounted on the shaft 51. Said gear 97 is provided with a clutch member 98 designed to be engaged by a clutch member 99 feathered to the shaft 51, said clutch member being actuated by means of a pivot lever 100, and a manually controlled rod 101.

The outer end of the clutch 99 is provided with one member 102 of a cone clutch designed to coact with a clutch member 103, when the member 99 is at its outer limit of movement, thereby providing means whereby the shaft 51 will be frictionally held against rotation when the clutch member 99 has been disengaged from the clutch member 98, and provides means for preventing free rotation of the wheels 50 when the said wheels are in an elevated position. Similar cone clutches may be provided for the clutch member 52 if so desired.

Any suitable means may be provided for connecting the rods 95 and 101 with suitable lever mechanism carried in the cab of the truck.

In Figures 12 and 13 I have illustrated a truck body 104 having a frame 105, each end of which is provided with car couplings 106 of the type employed for coupling railway cars. Each side of the frame 105 is provided with a pair of pedestals 107, each pedestal being formed with inner and outer walls 108 and 109, having vertical slots 110. A bearing member 111 is slidably mounted in each set of slots 110. The corresponding bearings 111 of opposite pedestals are designed to support an axle 112. The outer end of each axle 112 carries a flanged wheel 113.

Supported on top of each of the bearings 111 is the bar 39 having springs 41, before described in the structure illustrated in Figures 3 and 4. The members 62 and 39 are elevated and lowered by a hydraulic piston in the manner before described operating in a cylinder 114.

Supported beneath the bottom of the body 104 is a tank 115 for receiving air under pressure. A pipe 116 having a three-way valve 117 is provided. A pipe 118 is connected with the top of the cylinder, and a pipe 119 is connected with the bottom of the cylinder. A lever 120 is designed to actuate the valve having a rod 121 projected outwardly where it may be easily grasped by the operator. By this means the axles 112 together with the wheels 113 may be elevated and lowered at the will of the operator by simply operating the rod 121.

Air under pressure may be supplied to the tank 115 by means of the hose 122, which may be connected with a suitable air supply 123, such as used for charging pressure tanks in air brake systems, or any other suitable means may be employed for supplying air or liquid under pressure to said tank.

Supported back of the rear axle 112 is an axle 124 and a similar axle 125 is supported ahead of said axle. A front truck axle of ordinary construction is supported ahead of the front axle 112. Said axles are mounted by means of springs 126 in a manner common to automobile and truck practice. The axles 124 and 125 are designed to carry pneumatic road wheels 127. In this type of truck no means is provided for imparting power to any of the axles, the truck simply being used as a trailer or as a railway car.

By providing the supply tank 115, it may be adapted to operate the pistons 46 either by pneumatic or hydraulic means, so that the axles 12 may be elevated and lowered to shift the weight of the truck from one set of wheels to the other, at points remote from the air supply. The auxiliary air tank 115 also provides means whereby air from the tank may be utilized for inflating pneumatic tires. The power from the tank 115 is also adapted to jack up the road wheels when changing pneumatic tires, when the device is being operated on the road, by lowering either or both sets of flanged wheels to the ground surface and applying power to elevate the truck.

Although the drawings and description of my device relate to hydraulic means for elevating and lowering the flanged wheels, it will readily be seen that pneumatic means may be substituted therefor, in which the air may be derived from pipes ordinarily used for charging the train line of air bake systems.

It will further be seen that mechanically operated means might be substituted for the hydraulic elevating and lowering means, such as screw jacks, without departing from the spirit of my invention.

Considerable advantage is gained by employing the downwardly extending pedestals for slidably supporting the flanged wheels, as it has been found that this particular type of pedestal conforms more or less to standard railway design, whereby crystallization of the material is overcome, and whereby free springing motion is permitted. By permitting the springs 41 to move upwardly and downwardly relative to the main frame, it will be seen that no power is necessary to place tension on the spring each time the axle is moved upwardly and downwardly, as is the case when the spring is firmly fixed to the axles, in the manner employed in ordinary automobile design.

By this arrangement it will be seen that means is provided whereby the truck frame may be carried by flanged railway wheels or by the ordinary road wheels having pneumatic tires, at the will of the operator, so that the truck may be loaded and unloaded at points remote from the railway track, and conducted to said track by power imparted to the highway wheels and the truck conveyed to position above the railroad track and the track wheels caused to engage the rails with the road wheels elevated, whereby the truck may then be operated on the railroad track and its load carried at a considerable saving, and through portions of the country where the highways are impassable for heavy loads.

The transferring of the truck to the rails, or from the rails to the road surface, takes place on the ordinary road crossing where crossing platforms are provided, the surface of which is level with the top surface of the rails.

I claim as my invention:

1. The combination of a truck frame, a pair of front axles, a pair of rear axles, track wheels carried by one axle of each set of front and rear axles, road wheels carried by the other axles, means carried by said frame for elevating and lowering one axle of each set relative to said frame and relative to the other axle, and means for driving both sets of track wheels and one set of road wheels.

2. In combination, a truck frame having front and rear axles, road wheels carried by said axles, means for yieldably supporting said axles to said frame, an intermediate set of axles, track wheels carried by said intermediate axles, yieldable means supported between said axle and said frame, power operated means for elevating and lowering said yieldably supported means relative to said frame whereby the weight of said truck may be shifted to either set of wheels, and means for driving both sets of track wheels and one set of road wheels simultaneously.

3. In combination, a truck frame having front and rear axles, road wheels carried by said axles, a set of auxiliary axles, track wheels carried by said auxiliary axles, yieldable supporting means carried by said auxiliary axles, power operated means for moving said supporting means and said auxiliary axles toward and from said truck frame, supporting blocks adapted to be moved into and out of position between the yieldable supporting means and said frame when the frame is at its upper limit of movement, means for latching said frame to the auxiliary axles when the frame is at its lower position of movement, and manually controlled means for actuating said blocks and said latching means.

4. In combination, a truck frame having front and rear axles, road wheels carried by said axles, a set of auxiliary axles, track wheels carried by said auxiliary axles, means for driving both sets of track wheels and one set of road wheels, yieldable supporting means carried by said auxiliary axles, power operated means for moving said supporting means and said auxiliary axles toward and from said truck frame, supporting blocks adapted to be moved into and out of position between the yieldable supporting means and said frame when the frame is at its upper limit of movement, means for latching said frame to the auxiliary axles when the frame is at its lower position of movement, and manually controlled means for actuating said blocks and said latching means.

5. In a road and rail track vehicle, the combination of a supporting frame, a pair of road axles carried by said frame, road wheels for supporting said axles, a pair of pedestals depending from said frame including guide members, an axle supporting and spring retaining means slidably mounted in said guides to move toward and from said supporting frame, an axle carried by said axle supporting means, track wheels carried by said axle, a cylinder carried by said frame supported vertically above each axle supporting means, a piston in said cylinder, a rod connecting said piston to said axle and axle supporting means, means for conveying fluid under pressure to said cylinder to operate the piston whereby the axle supporting means together with the second axle will be moved toward and from the supporting frame, and means for locking the axle supporting means to said frame at either its elevated or lowered positions of movement.

6. In a road and rail track vehicle, the combination of a supporting frame, a pair of road axles carried by said frame, road wheels for supporting said axles, a pair of pedestals, depending from said frame including guide members, an axle supporting and spring retaining means slidably mounted in said guides to move toward and from said supporting frame, an axle carried by said axle supporting means, track wheels carried by said axle, a cylinder carried by said frame supported vertically above each axle supporting means, a piston in said cylinder, a rod connecting said piston to said axle and axle supporting means, means for conveying fluid under pressure to said cylinder to operate the piston whereby the axle supporting means together with the second axle will be moved toward and from the supporting frame, supporting blocks adapted to be moved into and out of position between the axle supporting means and said frame when the frame is at its upper limit of movement, means for latching said frame to said axle supporting means when at its lower position of movement, and means for actuating said blocks and said latching means.

GEORGE T. RONK.